Jan. 8, 1935.  J. T. REMEY  1,986,942
APPARATUS FOR SKY WRITING
Filed March 22, 1932   3 Sheets-Sheet 1
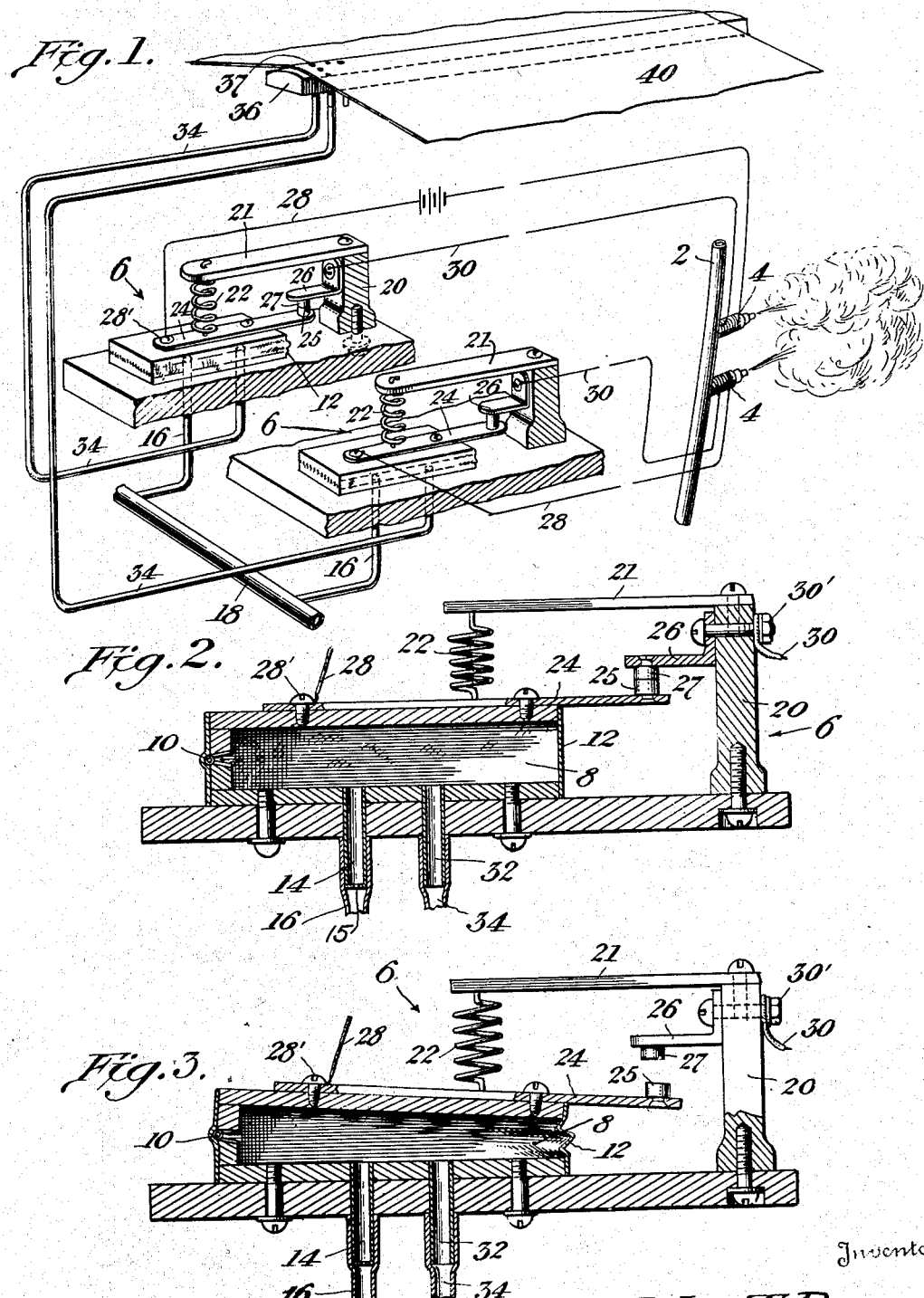
Inventor,
John T. Remey.
By Fisher Pedersen,
Attorneys.

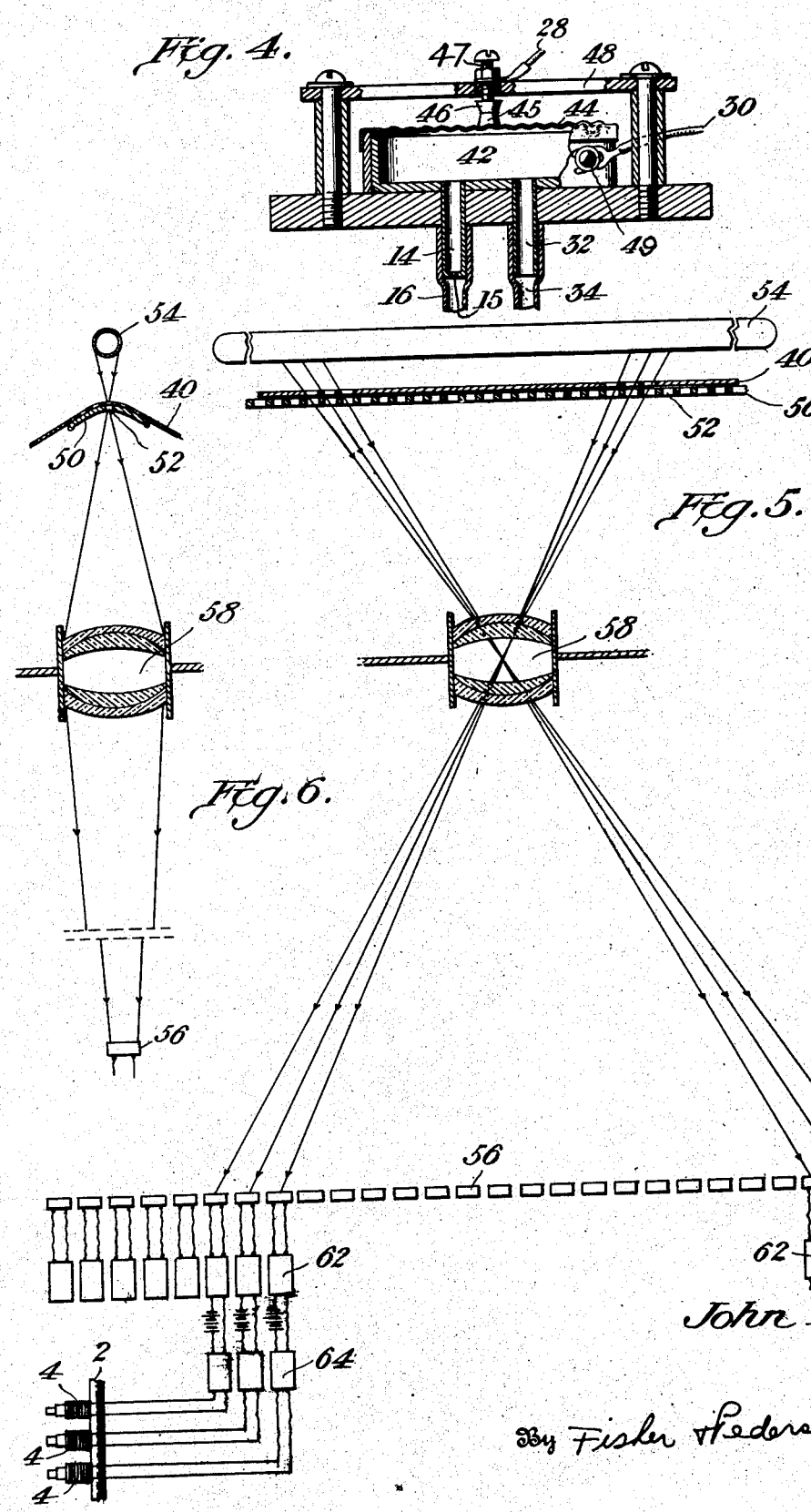

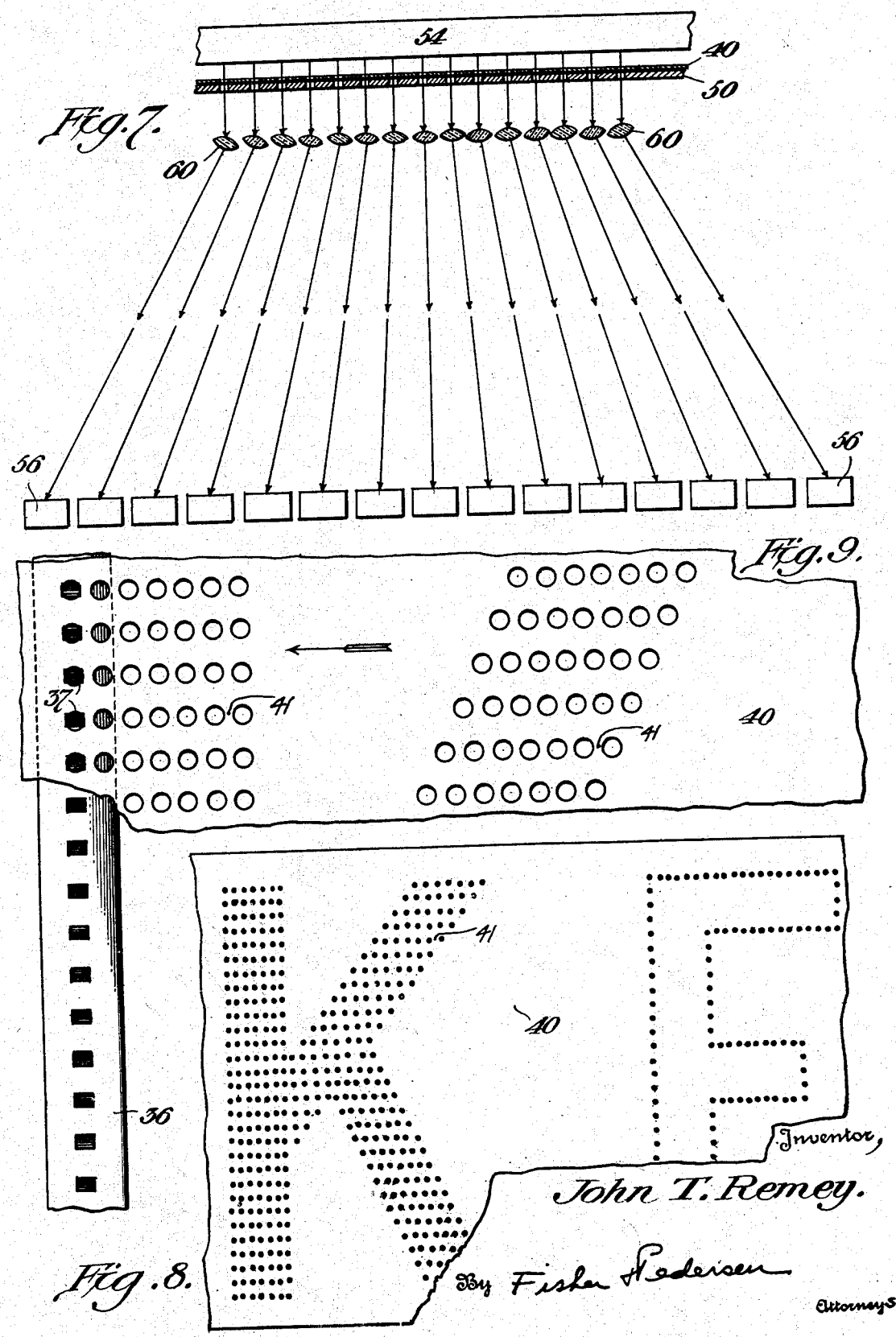

Patented Jan. 8, 1935

1,986,942

UNITED STATES PATENT OFFICE 1,986,942

APPARATUS FOR SKY WRITING

John T. Remey, New York, N. Y.

Application March 22, 1932, Serial No. 600,523

18 Claims. (Cl. 40—37)

This invention relates to improved apparatus for making signs, symbols, letters or pictures in the air with smoke. Where the symbols formed are letters, it may be called sky writing or sky typing.

The present invention is an improvement over the apparatus shown in my prior Patent No. 1,716,794, granted June 11, 1929. In that patent an aircraft, such as an airplane or dirigible is provided with a conduit which hangs down below the plane, which conduit carries some smoke forming substance. The term "smoke" as used in this specification is used to mean a cloud of finely divided material that is readily visible. The substance actually used is titanium tetrachloride (TiCl4), a substance which, when sprayed into atmospheric air, combines with the moisture in the air to make a cloud of "smoke". The term "smoke" is, therefore, used in a broad sense and is not limited to products of combustion.

The smoke carrying conduit which hangs down from the air craft is provided with a number of individually operated and electrically controlled smoke-emitting valves which are in fluid connection with the smoke forming fluid in the conduit. These valves are electrically operated so that any one can be opened for any desired length of time to emit a trail of smoke, all as shown in my prior patent above referred to, the length and placement of each smoke trail being controlled so that the entire set of smoke trails forms the desired letter or symbol or picture.

The valves are electrically operated, but the present invention is not concerned with the details of the valves. One type of valve is shown in my prior patent above referred to, although the present preferred form of valve is substantially that shown in my Patent No. 1,792,929, granted February 17, 1931.

In my Patent 1,716,794 the valves are controlled by a perforated control strip which passes over a tracker bar, metallic fingers dropping through the perforations in the control strip for closing circuits through the various valves, in accordance with the placement of the perforations in the control strip.

The present invention relates to an improved apparatus, also controlled by a perforated control strip, for actuating the smoke emitting valves.

In the present preferred form of the invention, the control mechanism from the control strip to the valves is a pneumatic-electrical one. That is to say, each valve is controlled by a relay which is pneumatically operated and its operation is controlled by the control strip. More specifically, the pneumatically operated relays are caused to open and close circuits through the valves in accordance with the size and placement of the perforations in the control strip.

The perforated control strip is provided with a plurality of small holes, set closely together, the small bridges of material between the holes being smaller than the holes in the tracker bar. A row of such closely set holes acts as the mechanical equivalent of a slot, but the strip is more durable than if slotted because of the small bridging portions between the holes.

In the present preferred embodiment of the invention, the pneumatic relay comprises a small bellows box which is normally subjected to a slight suction which holds the relay switch open. Each of these bellows boxes is connected by its own tube to its corresponding aperture in a tracker bar, the number of apertures in the tracker bar, the number of bellows operated relays, and the number of valves being the same. When the control strip passes over the tracker bar, certain of the apertures therein are uncovered by the perforations in the control strip, to thereby break or lessen the suction in the several bellows relays, allowing a spring to close the corresponding circuit or circuits to the several valves.

In a modified form of the invention, a similar principle is used, in that each smoke emitting valve has its own relay circuit for controlling it. Instead, however, of the relay being controlled by pneumatic means, it is controlled by photoelectric means. A perforated tracker bar is provided as before. There is a source of light near the tracker bar and a perforated control strip is adapted to pass between the light and the tracker bar so that individual light beams, corresponding to whatever tracker bar perforations are uncovered, pass through. There is provided, on the other side of the tracker bar, a number of photoelectric cells, of known construction, there being one of these cells for each perforation in the tracker bar and one for each smoke emitting valve. Through any desired arrangement of lenses, mirrors, prisms, or the like, the light rays that pass through the holes in the tracker bar are directed to the corresponding photo-electric cell, at a time, and for a length of time, determined by the perforations in the control strip. The cells, through their individual relay circuits, control corresponding smoke-emitting valves.

The main features of the invention having been thus outlined, reference will now be made to the accompanying drawings which illustrate in more detail the present preferred ways of carrying out the invention.

In these drawings, Fig. 1 is a diagrammatic perspective view of the present preferred embodiment of the invention;

Fig. 2 is a cross section through one of the bellows relays, with the circuit closed;

Fig. 3 is a view similar to Fig. 2 with the circuit open;

Fig. 4 shows a modified form of the bellows relay;

Fig. 5 illustrates diagrammatically the photoelectric modification of the invention;

Fig. 6 is a side view of part of Fig. 5;

Fig. 7 is a modification of Fig. 5;

Fig. 8 is a view of the perforated control strip; and

Fig. 9 is a view, on an enlarged scale of the perforated control strip and tracker bar.

Referring now to these figures in which similar reference characters indicate similar parts, the conduit for carrying the fluid which forms the smoke is indicated at 2; this conduit is provided with a plurality of electrically controlled valves 4 at spaced points therealong. The conduit may carry, say, 30 or 40 valves, but the precise number is not important. These valves may, for example, be of the type shown in my prior Patent 1,792,929.

The conduit 2 is adapted to be wound up on a drum and to be suspended from an aircraft in flight, as described in my prior Patent 1,716,794.

Each valve 4 is controlled by its own relay 6. Each relay comprises a base on which is mounted a bellows member 8, the upper and lower portions of which are hinged together at 10, the opposite end and sides being closed by a flexible diaphragm member 12. The interior of each bellows member is connected to a pipe or tube 14, provided with a bleed hole 15; tube 14 is connected by pipe 16 to a low vacuum line 18, whereby the interior of the bellows is subjected to this slight vacuum, thus holding the bellows collapsed as shown in Figure 3.

Mounted on the base of the relay is a standard 20 of insulating material, carrying an arm 21 which supports a spring 22 which is connected to the top of the bellows and exerts a force tending to lift the top of the bellows. The suction, however, to which the bellows is subjected normally keeps it collapsed as shown in Figure 3.

The top of the bellows member is preferably made of some such material as bakelite and carries a metallic arm 24 and contact piece 25, while the standard 20 carries a metallic arm 26 and contact piece 27. Wires 28 and 30 in circuit, through a power source with the valve 4, are connected at 28' and 30' to the described arms 24 and 26. In practice, only a single wire need lead to each valve, the return circuit being provided by a common ground, as is readily understood in the electrical art.

The interior of the bellows is also provided with a tube 32 which connects with a tube 34 which communicates with its individual compartment in a tracker bar 36, the top of each compartment being provided with one or more air admitting apertures 37. The mentioned compartments in the tracker bar are formed by a plurality of transverse air tight partitions. It will be understood that if there are thirty valves, there would be thirty relays, thirty compartments in the tracker bar, each connected, as has been described, for controlling its particular valve.

A control sheet 40 of paper or the like is provided with apertures, perforations, or slots placed in a design according to the letters, symbol or picture that it is desired to reproduce in smoke.

In operation, as the strip 40 is moved slowly across the tracker bar by any suitable mechanism, air will be admitted through the perforations in the control sheet to certain of the compartments in the tracker bar, depending on the placement of the perforations, and this air will pass down each of the tubes 34 to the respective bellows members, breaking the vacuum in such bellows members, whereupon the spring 22 will lift the top of the bellows and arm 24 to close a circuit through the corresponding smoke emitting valve 4, to cause it to make a smoke trail, the length and placement of which depends on when the valve was opened and how long it was held open, factors which, in turn, will be controlled by the particular placement of the perforations in the control sheet 40.

In the modified bellows relay member shown in Figure 4, a cup member 42 is closed air-tight across the top by a flexible metallic diaphragm 44 provided with an electrical contact member 45 adapted to contact with another contact member 46 electrically connected to wire 28 from the valve 4. Contact 46 is adjustable as by attaching it to set screw 47. The supporting arm 48 of the contact 46 is of insulating material.

The inside of the bellows member 42 is subjected to a low vacuum from a pipe 14 as before and is connected by pipes 32 and 34 with its individual compartment in the tracker bar 36. Wire 30 from the smoke emitting valve is in electrical contact at 49 with the flexible top 44.

In operation, the suction to which member 42 is subjected normally will cause its flexible top 44 to bend downwardly to keep the circuit open. When, however, air is admitted through the proper perforation in control sheet 40 to the corresponding tracker bar compartment and thence to cup 42, the vacuum is broken and the normal resiliency of the diaphragm 44 will cause it to move up to close the circuit as shown in Figure 4 and open the corresponding smoke emitting valve.

Reference will now be made to Figures 5, 6 and 7 describing a photo-electric relay instead of a pneumatic relay for controlling the smoke emitting valve.

In this modification, the tracker bar 50 is provided with a number of light transmitting apertures 52 corresponding in number to the number of smoke emitting valves. On one side of the tracker bar is a source of light 54 which will supply light to all of the apertures 52. At a suitable distance there is placed a number of photo-electric cells 56, corresponding in number to the number of apertures 52 in the tracker bar and to the number of smoke emitting valves, 4. Arranged between the light transmitting apertures 52 and the photo-electric cells 56 is any suitable optical means for causing a particular light beam passing through a particular aperture to engage its particular photo-electric cell and none other. This may be accomplished by a lens system 58 or by a plurality of light refracting or light reflecting devices 60, which might be lenses, prisms or mirrors or combinations of them.

The particular structure of the photo-electric cells is known and forms no part of this invention. These cells have the known property of releasing, generating or emitting a small current when a beam of light hits them and of stopping the current when the beam of light is interrupted. Connected to each cell, therefore, is a sensitive relay 62 and each relay 62 is connected to and controls a power relay 64, and each power relay 64 is in circuit with and controls one of the smoke emitting valves 4. A common power source, such as a battery, supplies power to all the relays, and the circuit completed by a common ground back to the battery. In practice, the current from a cell might be strong enough to operate a power relay 64, in which event the intermediate relays 62 could be dispensed with. The relays 64 could be arranged to break circuits, instead of to close circuits, a simple matter of reversal of conditions, as is understood in the electrical art. The break of the circuit would then cause the valve to open, and the closing of the circuit cause it to close.

In operation, control sheet 40 provided with slots, holes or other suitable perforations, is led over the tracker bar and beams of light, depending upon the placement of such perforations, are directed to corresponding photo-electric cells, through which the described relays will open the corresponding smoke emitting valves 4 at a time, and for a length of time, depending upon the particular size and placement of the perforations or slots in control sheet 40.

The apertures in control sheet 40 for either embodiment of the invention may be slots, but preferably, as shown in Fig. 8, take the form of closely arranged holes separated by small bridge portions 41, which bridge portions are smaller than an aperture in the tracker bar. The holes, instead of being closely arranged, may merely outline the letter or symbol which it is desired to reproduce in smoke, as in the letter E, Fig. 8. By the term "physical impulses" of an operating medium, as used in the claims, is meant air impulses, as shown in Fig. 1, or light impulses, as shown in Figs. 5 or 7, or their equivalents, as will be apparent to those skilled in the art.

While the several embodiments of the invention have been described in some detail, it should be understood that these embodiments are illustrative and not restrictive of the invention, and that it may be carried out in other ways than in the precise forms shown.

I claim as my invention:—

1. In the art of sky writing, a smoke emitting device comprising in combination means for retaining a smoke-forming substance, a plurality of valves for controlling smoke emission from said means, electrical means for controlling operation of said valves, relay means, operable through physical impulses of an operating medium, for controlling said electrical means, and a control strip operable to control the physical impulses of the operating medium thus avoiding destruction or deterioration of said strip by sparking or other deteriorating agencies.

2. In the art of sky writing, a smoke emitting device comprising in combination means for retaining a smoke-forming substance, a plurality of valves for controlling smoke emission from said means, electrical means for controlling operation of said valves, means operable pneumatically for controlling said electrical means, and a control strip operable to control the physical impulses of the pneumatic medium, thus avoiding destruction or deterioration of said strip by sparking or other deteriorating agencies.

3. In the art of sky writing, a smoke emitting device comprising in combination means for retaining a smoke-forming substance, a plurality of valves for controlling smoke emission from said means, electrical means for controlling the operation of said valves, means operable through impulses of light for controlling said electrical means, and a control strip operable to control the light impulses, thus avoiding destruction or deterioration of said strip by sparking or other deteriorating agencies.

4. In an apparatus for sky writing by means of smoke, in combination, a fluid carrying conduit, a plurality of electrically controlled, smoke-emitting valves carried by the conduit, at intervals therealong, a control circuit, including a pneumatically operated relay, for each valve, and means, including a control strip, for controlling the several relays.

5. In an apparatus for sky writing by means of smoke, in combination, a control strip, pneumatic means controlled thereby, a fluid carrying conduit, and a plurality of electrically controlled, smoke-emitting valves communicating with the conduit, controlled by said pneumatic means.

6. In an apparatus for sky writing by means of smoke, in combination a control strip, pneumatic means normally subjected to sub-atmospheric pressure, controlled thereby, a fluid carrying conduit, and a plurality of electrically controlled, smoke-emitting valves communicating with the conduit, controlled by said pneumatic means.

7. In an apparatus for sky writing by means of smoke, in combination, a plurality of electrically controlled, smoke-emitting valves, a corresponding plurality of pneumatically operated, circuit closing devices, respectively connected to the valves, and means, including a control strip, for controlling the pneumatically operated devices.

8. In an apparatus for sky writing by means of smoke, in combination, a plurality of electrically controlled, smoke-emitting valves, a corresponding plurality of pneumatically operated, circuit closing devices, normally subjected to sub-atmospheric pressure, respectively connected to the valves, and means, including a control strip, for controlling the pneumatically operated devices.

9. In an apparatus for sky writing by means of smoke, in combination, a plurality of electrically controlled, smoke-emitting valves, a corresponding plurality of pneumatically operated, circuit closing devices, respectively connected to the valves, and means, including a control strip and a tracker bar, for controlling the pneumatically operated devices.

10. In an apparatus for sky writing by means of smoke, in combination, a fluid carrying conduit, a plurality of electrically controlled, smoke-emitting valves, spaced at intervals along the conduit and communicating therewith, a corresponding plurality of pneumatically operated, circuit closing devices, respectively connected to said valves, and means for selectively controlling said pneumatically operated devices.

11. In an apparatus for sky writing by means of smoke, in combination, a fluid carrying conduit, a plurality of electrically controlled, smoke-emitting valves, spaced at intervals along the conduit and communicating therewith, a corresponding plurality of pneumatically operated, circuit closing devices, normally subjected to sub-atmospheric pressure, respectively connected to said valves, and means for selectively controlling said pneumatically operated devices.

12. In an apparatus for sky writing by means of smoke, in combination, a fluid carrying conduit, a plurality of electrically controlled, smoke-emitting valves, spaced at intervals along the conduit and communicating therewith, a corresponding plurality of pneumatically operated, circuit closing devices, respectively connected to said valves, and means, including a control strip, for selectively controlling said pneumatically operated devices.

13. In an apparatus for sky writing by means of smoke, in combination, a fluid carrying conduit, a plurality of electrically controlled, smoke-emitting valves, spaced at intervals along the conduit and communicating therewith, a corresponding plurality of pneumatically operated, circuit closing devices, respectively connected to said valves, and means, including a control strip and tracker bar, for selectively controlling said pneumatically operated devices.

14. In an apparatus for sky writing by means of smoke, in combination, a fluid carrying conduit, a plurality of electrically controlled, smoke-emitting valves, spaced at intervals along the conduit and communicating therewith, a corresponding plurality of pneumatically operated, circuit closing devices, normally subjected to air suction, respectively connected to said valves, and means, including a control strip and tracker bar, for selectively controlling said pneumatically operated devices.

15. In an apparatus for sky writing by means of smoke, in combination, a fluid carrying conduit, a plurality of electrically controlled, smoke-emitting valves carried by the conduit, at intervals therealong, a control circuit, including a photo-electrically controlled relay, for each valve, and means, including a control strip, for controlling the several relays.

16. In an apparatus for sky writing by means of smoke, in combination, a purality of electrically controlled, smoke-emitting valves, a control circuit for each valve, photo-electric means for controlling the valve circuits, and means, including a control strip, for controlling said photo-electric means.

17. In an apparatus for sky writing by means of smoke, in combination, a fluid carrying conduit, a plurality of electrically controlled, smoke-emitting valves, spaced along the conduit and communicating therewith, a control circuit for each valve, photo-electric means for controlling the valve circuits, and means, including a control strip, perforated for transmitting light, for controlling said photo-electric means.

18. In an apparatus for sky writing by means of smoke, in combination, a fluid carrying conduit, a plurality of electrically controlled valves spaced at intervals along the conduit and in fluid communication with the conduit, a corresponding plurality of relay circuits for the respective valves, a corresponding plurality of photo-electric cells for controlling respective relay circuits, and means, including a control strip, perforated for transmitting light, for controlling the action of the photo-electric cells.

JOHN T. REMEY.